(12) United States Patent
Kroeger et al.

(10) Patent No.: US 10,794,066 B2
(45) Date of Patent: Oct. 6, 2020

(54) SELF-ADHESIVE FLOOR COVERING AND METHOD FOR THE PRODUCTION THEREOF

(71) Applicant: NORA SYSTEMS GMBH, Weinheim (DE)

(72) Inventors: Mario Kroeger, Bruchsal (DE); Paul Adametz, Mannheim (DE)

(73) Assignee: NORA SYSTEMS GMBH (DE)

( * ) Notice: Subject to any disclaimer, the term of this patent is extended or adjusted under 35 U.S.C. 154(b) by 0 days.

(21) Appl. No.: 16/064,739

(22) PCT Filed: Dec. 16, 2016

(86) PCT No.: PCT/EP2016/081429
§ 371 (c)(1),
(2) Date: Jun. 21, 2018

(87) PCT Pub. No.: WO2017/108612
PCT Pub. Date: Jun. 29, 2017

(65) Prior Publication Data
US 2019/0024385 A1    Jan. 24, 2019

(30) Foreign Application Priority Data

Dec. 22, 2015   (DE) .................. 10 2015 122 532
Jun. 8, 2016    (DE) .................. 10 2016 110 589

(51) Int. Cl.
*E04F 15/02*     (2006.01)
*B32B 25/00*     (2006.01)
(Continued)

(52) U.S. Cl.
CPC ............ *E04F 15/0215* (2013.01); *B32B 7/06* (2013.01); *B32B 7/12* (2013.01); *B32B 25/00* (2013.01);
(Continued)

(58) Field of Classification Search
CPC ... E04F 15/0215; E04F 15/107; E04F 15/105; B32B 27/32; B32B 27/302; B32B 27/10;
(Continued)

(56) References Cited

U.S. PATENT DOCUMENTS 3,770,536 A * 11/1973 Haigh ................ B32B 27/00
                                                    156/71
4,694,627 A *  9/1987 Omholt .................. E04F 15/22
                                                    52/390

(Continued)

FOREIGN PATENT DOCUMENTS

CN         101018905        8/2007
CN         202000620        10/2011

(Continued)

OTHER PUBLICATIONS

Translation of International Preliminary Report on Patentability for International (PCT) Patent Application No. PCT/EP2016/081429, dated Jul. 5, 2018, 10 pages.

(Continued)

*Primary Examiner* — Brent W Herring
(74) *Attorney, Agent, or Firm* — Sheridan Ross PC

(57) ABSTRACT

The invention relates to a self-adhesive floor covering comprising a base layer, containing a polymer composition, which comprises an elastomer and/or a thermoplastic elastomer, wherein the floor covering has, on a first side of the base layer, an adhesive layer comprising an adhesive for connecting the floor covering to a substrate. The floor covering is characterised in that the adhesive comprises a styrene-based thermoplastic elastomer. The invention also relates to a method for producing a self-adhesive floor covering.

22 Claims, 2 Drawing Sheets

(51) Int. Cl.

| | | |
|---|---|---|
| *E04F 15/10* | (2006.01) | |
| *B32B 27/32* | (2006.01) | |
| *B32B 25/16* | (2006.01) | |
| *B32B 27/30* | (2006.01) | |
| *B32B 27/08* | (2006.01) | |
| *B32B 25/08* | (2006.01) | |
| *B32B 7/06* | (2019.01) | |
| *B32B 25/06* | (2006.01) | |
| *B32B 25/02* | (2006.01) | |
| *B32B 27/10* | (2006.01) | |
| *B32B 7/12* | (2006.01) | |
| *B32B 25/12* | (2006.01) | |
| *B32B 37/12* | (2006.01) | |
| *B32B 38/10* | (2006.01) | |
| *B32B 25/04* | (2006.01) | |

(52) U.S. Cl.
CPC .............. *B32B 25/02* (2013.01); *B32B 25/06* (2013.01); *B32B 25/08* (2013.01); *B32B 25/12* (2013.01); *B32B 25/16* (2013.01); *B32B 27/08* (2013.01); *B32B 27/10* (2013.01); *B32B 27/302* (2013.01); *B32B 27/32* (2013.01); *E04F 15/105* (2013.01); *E04F 15/107* (2013.01); *B32B 25/042* (2013.01); *B32B 37/1284* (2013.01); *B32B 38/10* (2013.01); *B32B 2037/1215* (2013.01); *B32B 2250/02* (2013.01); *B32B 2250/24* (2013.01); *B32B 2255/10* (2013.01); *B32B 2255/26* (2013.01); *B32B 2264/067* (2013.01); *B32B 2264/10* (2013.01); *B32B 2264/101* (2013.01); *B32B 2264/102* (2013.01); *B32B 2264/104* (2013.01); *B32B 2264/107* (2013.01); *B32B 2272/00* (2013.01); *B32B 2274/00* (2013.01); *B32B 2307/4026* (2013.01); *B32B 2307/748* (2013.01); *B32B 2405/00* (2013.01); *B32B 2419/04* (2013.01); *B32B 2451/00* (2013.01); *B32B 2471/00* (2013.01)

(58) Field of Classification Search
CPC ......... B32B 27/08; B32B 25/16; B32B 25/12; B32B 25/08; B32B 25/06; B32B 25/02; B32B 7/12; B32B 7/06; B32B 25/00; B32B 25/042; B32B 2451/00; B32B 2405/00; B32B 2307/748; B32B 2307/4026; B32B 2272/00; B32B 2264/107; B32B 2264/104; B32B 2264/102; B32B 2264/101; B32B 2264/10; B32B 2264/067; B32B 2255/26; B32B 2255/10; B32B 2250/24; B32B 2250/02; B32B 2419/04; B32B 2471/00; B32B 2037/1215; B32B 38/10; B32B 37/1284; B32B 2274/00
USPC .... 52/403.1, 408, 411, 506.01, 782.1, 796.1, 52/746.1
See application file for complete search history.

(56) References Cited

U.S. PATENT DOCUMENTS

| | | | |
|---|---|---|---|
| 4,755,545 A | 7/1988 | Lalwani | |
| 5,271,999 A * | 12/1993 | Short | C09J 7/387 442/151 |
| 6,428,873 B1 * | 8/2002 | Kerr | A46B 5/06 428/95 |
| 6,630,042 B2 * | 10/2003 | Smith | B32B 25/04 156/71 |
| 7,494,713 B2 | 2/2009 | Song et al. | |
| 7,833,611 B2 * | 11/2010 | Phan | B32B 7/12 264/211.21 |
| 9,163,356 B2 | 10/2015 | Kuik et al. | |
| 9,598,871 B2 * | 3/2017 | Qiong | E04F 15/02172 |
| 9,650,545 B2 * | 5/2017 | Liu | B32B 7/12 |
| 2002/0129895 A1 * | 9/2002 | Smith | B32B 25/04 156/307.1 |
| 2005/0142356 A1 * | 6/2005 | Zhou | B32B 5/02 428/340 |
| 2006/0059825 A1 | 3/2006 | Wiercinski et al. | |
| 2006/0062955 A1 * | 3/2006 | Liu | B32B 7/12 428/40.1 |
| 2007/0116959 A1 * | 5/2007 | Wang | B32B 7/12 428/412 |
| 2008/0081186 A1 * | 4/2008 | Ellringmann | B65H 19/102 428/343 |
| 2009/0226661 A1 * | 9/2009 | Laurent | A47L 23/266 428/88 |
| 2011/0039051 A1 * | 2/2011 | Flowers, Jr. | B32B 3/30 428/78 |
| 2011/0305886 A1 | 12/2011 | Phan et al. | |
| 2012/0309876 A1 | 12/2012 | Bastin et al. | |
| 2013/0055665 A1 * | 3/2013 | Qiong | E04F 15/02172 52/177 |
| 2013/0089689 A1 * | 4/2013 | Liu | B32B 7/12 428/40.9 |
| 2013/0284364 A1 * | 10/2013 | Couturier | C04B 26/04 156/307.1 |
| 2013/0296504 A1 * | 11/2013 | Sugi | C09J 11/06 525/460 |
| 2013/0330528 A1 * | 12/2013 | Keller | B32B 1/00 428/212 |
| 2014/0011929 A1 | 1/2014 | Knoll et al. | |
| 2015/0284903 A1 * | 10/2015 | O'Conner | D06N 7/0089 156/71 |
| 2017/0298255 A1 * | 10/2017 | Liu | B32B 7/12 |
| 2018/0127987 A1 * | 5/2018 | Bradway | B32B 7/12 |

FOREIGN PATENT DOCUMENTS

| | | |
|---|---|---|
| CN | 102712791 | 10/2012 |
| DE | 4440394 | 5/1995 |
| DE | 69327611 | 7/2000 |
| DE | 102009059172 | 6/2011 |
| DE | 102010036121 | 3/2012 |
| EP | 0270888 | 6/1988 |
| EP | 1793032 | 6/2007 |
| EP | 2452815 | 5/2012 |
| EP | 2513208 | 3/2016 |
| JP | 2002-276141 | 9/2002 |
| JP | 2005-54001 | 3/2005 |
| JP | 2005-120559 | 5/2005 |
| JP | 2005-163534 | 6/2005 |
| RU | 2373311 | 11/2009 |
| RU | 2524310 | 7/2014 |
| WO | WO 93/20146 | 10/1993 |
| WO | WO 2011/063849 | 6/2011 |
| WO | WO 2012/017235 | 2/2012 |
| WO | WO 2014/005631 | 1/2014 |
| WO | WO 2014/096336 | 6/2014 |

OTHER PUBLICATIONS

Translation of International Preliminary Report on Patentability for International (PCT) Patent Application No. PCT/EP2016/081492, dated Jul. 5, 2018, 11 pages.
"Nora Newsletter," nora systems Gmbh, Apr. 2015, 16 pages [ntx.nora.com/de-ins.html].
Habenich et al. "Kleben, Grundlagen, Technologien, Anwendung," Springer, 2002, Berlin, 4th edition, p. 61-64. ISBN: 3-540-43340-6.
U.S. Appl. No. 16/065,219, filed Jun. 22, 2018, Adametz et al.
Search Report for German Patent Application No. 102016110589.9, dated Apr. 21, 2017, 9 pages.
Search Report for German Patent Application No. DE102015122532. 8, dated Aug. 23, 2016, 9 pages.

(56) References Cited

OTHER PUBLICATIONS

International Search Report prepared by the European Patent Office dated Mar. 8, 2017, for International Application No. PCT/EP2016/081492.
International Search Report prepared by the European Patent Office dated Jan. 25, 2017, for International Application No. PCT/EP2016/081429.
Official Action for China Patent Application No. 201680081526.4, dated Sep. 18, 2019, 10 pages.
Official Action with machine translation and Search Report for Russia Patent Application No. 2018124505/04, dated Aug. 6, 2019, 12 pages.
Search Report for Russia Patent Application No. 2018124349/03, dated Aug. 19, 2019, 2 pages.
Official Action for China Patent Application No. 201680074887.6, dated Apr. 7, 2020, 8 pages.

* cited by examiner

SELF-ADHESIVE FLOOR COVERING AND METHOD FOR THE PRODUCTION THEREOF

CROSS REFERENCE TO RELATED APPLICATIONS

This application is a national stage application under 35 U.S.C. 371 and claims the benefit of PCT Application No. PCT/EP2016/081429 having an international filing date of 16 Dec. 2016, which designated the United States, which PCT application claimed the benefit of German Patent Application No. 10 2015 122 532.8 filed 22 Dec. 2015, and German Patent Application No. 10 2016 110 589.9 filed 8 Jun. 2016, the disclosure of each of which are incorporated herein by reference.

The invention relates to a self-adhesive floor covering comprising a base layer, containing a polymer composition, which comprises an elastomer and/or a thermoplastic elastomer, wherein the floor covering has, on a first side of the base layer, an adhesive layer comprising an adhesive for connecting the floor covering to a substrate.

Floor coverings of elastomer have hitherto generally been adhered to the substrate by means of liquid dispersion adhesives which are applied only during the laying procedure. Nevertheless, self-adhesive floor coverings have already been proposed.

For example, EP 2 513 208 A1 describes floor coverings consisting of different materials which are provided with an adhesive layer. In this connection, an adhesive on the basis of acrylate or silicone is used for the adhesive layer.

EP 0 270 888 A2 describes a floor covering which is provided with a contact adhesive on the basis of rubber, EVA copolymer or polyacrylate. The described floor covering is to be connected in a detachable manner to the substrate.

It has been realized that floor coverings of elastomer or thermoplastic elastomer cannot be adhered in an optimum manner using the known solutions for self-adhesive floor coverings. This relates both to the strength of the adhesion and the conditions during adhesion, and to handling.

Therefore, the object of the invention is to provide a self-adhesive floor covering which can be adhered easily and reliably to a substrate. The object of the invention is also to provide a method for producing such a floor covering.

The object is achieved in a floor covering having the features of claim 1. Accordingly, in the case of a self-adhesive floor covering stated in the introduction which comprises a polymer composition having an elastomer and/or a thermoplastic elastomer, provision is made that the adhesive comprises a styrene-based thermoplastic elastomer. It has been realized that particularly good adhesion properties can be achieved with the combination of features claimed. This relates inter alia to the peel resistance which is a measure of the strength of the adhesive connection to a substrate. In this connection, it has been demonstrated that an effective adhesive connection can be achieved with the combination of features claimed, even under conditions in which reliable adhesion of the floor covering to the substrate hitherto could not be achieved. In particular, by means of the claimed features a floor covering of elastomer or thermoplastic elastomer can also be securely laid onto substrates which are not completely dry. Therefore, less stringent requirements have to be imposed on the moisture content of the substrate compared to previously. This contributes, in particular when used in buildings, to rapid progress in construction because shorter drying times for substrates, such as e.g. screeds, have to be observed. This alone explains that handling of the floor covering to be adhered is particularly easy and safe during adhesion. In particular, the risk of flaws arising from insufficient drying of the substrate is reduced. However, otherwise handling is also particularly easy because the self-adhesive floor covering can be easily cut to length and adhered to a substrate. In particular, it is possible to dispense with the complex application of an adhesive during the laying procedure because the self-adhesive floor covering has already been coated in advance with the required quantity of adhesive. This reliably avoids possible flaws during the laying procedure. Moreover, the material requirements can be reduced by an industrial application of the adhesive layer to the floor covering. Therefore, the floor covering also ensures that resources are used particularly efficiently. Furthermore, the floor covering can be produced in a cost-effective manner.

The floor covering in accordance with the invention is suitable for different applications. In addition to the application in buildings, the floor covering can be used in particular also in vehicles of all types, in particular rail vehicles, such as trains and trams or the like, and buses. By virtue of the fact that the base layer contains an elastomer consisting of cross-linked rubber or a thermoplastic elastomer, the floor covering is exceptionally durable and is also suitable for withstanding heavy loads which occur e.g. in public buildings and on public transport.

The object in accordance with the invention is also achieved in a method having the features of claim 12. Accordingly, provision is made that the method for producing a self-adhesive floor covering comprises the steps of:

providing a base layer which comprises an elastomer and/or a thermoplastic elastomer;

providing an adhesive which comprises a styrene-based thermoplastic elastomer;

applying the adhesive to a first side of the base layer for producing a floor covering with an adhesive layer for connecting to a substrate.

Further advantageous features of the invention will be described hereinafter. The described features each relate to both the floor covering and the method for producing same.

An advantageous embodiment of the invention provides that the adhesive is a contact adhesive. In this connection, it is particularly preferred if the adhesive is a pressure-sensitive contact adhesive. In this manner, particularly good adhesion properties can be achieved. Moreover, the production of the floor covering can be performed reliably and cost-effectively. A contact adhesive has a permanent surface tack (so-called tack) within the application temperature (in this case typical room temperatures). This surface tack enables the easy adhesion of the floor covering to the substrate by means of light contact pressure. In particular, the adhesive has the property of a contact adhesive at room temperature (20° C.). Particularly preferably, the adhesive has the property of a contact adhesive over the temperature range of 0° C. to 40° C.

Advantageously, the adhesive is a hot-melt adhesive. Particularly good adhesion properties can be achieved with a hot-melt adhesive. Moreover, production can be performed easily and reliably. In a particularly preferred manner, the adhesive is a hot-melt contact adhesive on the basis of thermoplastic rubber.

Furthermore, it contributes to good adhesion properties if the styrene-based thermoplastic elastomer of the adhesive comprises a styrene block copolymer (TPE-S).

A further improvement provides that the styrene-based thermoplastic elastomer comprises a triblock copolymer having the structure S—X—S, wherein S is a styrene block and X is a block having elastomeric properties at 20° C. Preferably, at 20° C., the styrene block is a glass-like or crystalline block which melts at higher temperatures. These measures contribute to good adhesion properties of the self-adhesive floor covering. Preferably, the block X comprises an isoprene monomer and/or a butadiene monomer.

It also contributes to good adhesion properties if the styrene-based thermoplastic elastomer comprises a diblock copolymer. In this connection, it is preferred if the proportion of the diblock copolymer is more than 5% and particularly preferably is more than 10% based on the quantity of the styrene-based thermoplastic elastomer. Particularly good properties are achieved in the case of a diblock proportion of more than 15%. Advantageously, the diblock proportion is less than 75% based on the quantity of the styrene-based thermoplastic elastomer. Preferably, the diblock copolymer comprises a styrene block. Furthermore, it is preferred if the diblock copolymer comprises an isoprene monomer and/or a butadiene monomer. Particularly good adhesion properties are achieved if the styrene-based thermoplastic elastomer comprises both a triblock copolymer and a diblock copolymer.

According to a preferred embodiment, provision is made that the styrene-based thermoplastic elastomer comprises at least one compound from the group consisting of styrene-butadiene-styrene-block copolymer (SBS), styrene-isoprene-styrene block copolymer (SIS), styrene-ethylene-butylene-styrene block copolymer (SEBS) and styrene-ethylene-propylene-styrene block coopolymer (SEPS). As a result, particularly good adhesion properties are achieved. SBS, SIS and mixtures thereof are particularly preferred.

A further advantageous improvement provides that the styrene-based thermoplastic elastomer has a styrene content between 15 wt. % and 40 wt. %.

The adhesion properties are improved further by virtue of the fact that the adhesive comprises a hydrocarbon resin.

Good adhesion properties are achieved particularly if the adhesive layer has a density between 0.9 $g/cm^3$ and 1.0 $g/cm^3$.

Advantageously, the adhesive layer has a viscosity between 10000 mPas and 30000 mPas at 180° C. The viscosity can be measured according to the standard ASTM D3236 (ring+ball testing method).

Preferably, the adhesive layer contains less than 0.5% solvent.

Preferably, the content of volatile organic compounds (VOC content) of the adhesive layer is less than 0.1%. Particularly preferably, the VOC content is 0%.

The adhesion properties are improved further by virtue of the fact that the adhesive is not water-soluble. In particular, the adhesive can be non-polar.

Preferably, the softening range of the adhesive layer is between 80° C. and 150° C. The softening range is determined using the Kofler heating bench.

Preferably, the adhesive layer comprises oil or wax as a processing aid.

Preferably, the adhesive layer comprises an antioxidant agent.

A preferred embodiment of the invention provides that the adhesive is applied to the first side of the base layer in a quantity between 10 $g/m^2$ and 1000 $g/m^2$. The first side can be in particular the underside of the base layer. Preferably, the adhesive is applied to the first side in a quantity between 50 $g/m^2$ and 300 $g/m^2$. Particularly preferably, the adhesive quantity is between 125 $g/m^2$ and 175 $g/m^2$.

Good adhesion properties are also achieved if the adhesive layer has a layer thickness between 0.01 mm and 1 mm. Preferably, the layer thickness is between 0.05 mm and 0.2 mm.

In accordance with the invention, it is also preferred that the adhesive layer covers more than 50% of the area of the first side of the base layer. Preferably, the adhesive layer covers more than 90% and particularly preferably more than 99% of the area of the first side. In particular, the adhesive layer can be provided over the entire surface of the base layer.

A further improvement is achieved by virtue of the fact that the adhesive layer is provided with a removable cover. Preferably, the cover consists of paper or film. It is particularly preferred if the paper or film is coated so that it can be easily peeled off. In particular, the cover can comprise a siliconized HDPE film. The self-adhesive floor covering provided with the cover can be easily stored, transported and cut to length. When the floor covering is to be laid, it is sufficient to peel off the cover. The adhesive layer can then be adhered to the substrate.

A particularly preferred embodiment of the invention provides that the polymer composition of the base layer comprises a polymer which comprises at least one monomer unit selected from the group consisting of styrene, butadiene and isoprene. This contributes to good adhesion properties. In particular, high peel resistances can advantageously be achieved therewith. Preferably, provision is made that the elastomer and/or the thermoplastic elastomer has the polymer with the at least one monomer unit selected from the group consisting of styrene, butadiene and isoprene.

A further improvement provides that the polymer composition comprises at least one substance selected from the group consisting of natural rubber (NR), polybutadiene (BR), styrene-butadiene rubber (SBR), acrylonitrile-butadiene rubber (NBR), styrene-butadiene-styrene block copolymer (SBS) and styrene-isoprene-styrene block copolymer (SIS). NR contains the monomer unit isoprene. BR contains the monomer unit butadiene. SBR contains the monomer units styrene and butadiene. NBR contains the monomer unit butadiene. SBS contains the monomer units butadiene and styrene. SIS contains the monomer units styrene and isoprene.

Preferably, the proportion of the at least one substance selected from the group consisting of NR (natural rubber), BR (polybutadiene), SBR (styrene-butadiene rubber), NBR (acrylonitrile-butadiene rubber), SBS (styrene-butadiene-styrene block copolymer) and SIS (styrene-isoprene-styrene block copolymer) is more than 20 wt. % based on the total quantity of polymers in the base layer. Preferably, the proportion is more than 50 wt. %.

It also contributes to advantageous adhesion properties if the base layer has a matrix which contains the polymer composition. Preferably, the polymer which comprises at least one monomer unit selected from the group consisting of styrene, butadiene and isoprene is a component of the matrix. It is also preferred that the polymer composition forms a binding agent of the matrix.

It contributes to a further improvement of the adhesion properties if the matrix contains a filler. Preferably, the filler comprises at least one substance selected from the group consisting of chalk, silicic acid, silica, aluminium hydroxide, kaolin, sodium aluminium silicate, glass powder and wood flour. In accordance with the invention, it is particularly preferred if the filler comprises silica and/or chalk. Preferably, the filler is contained in the matrix with a weight proportion between 50 and 500 based on 100 parts polymer in the matrix. It is particularly preferred if the aforementioned weight proportion is between 150 and 300.

In accordance with the invention, provision can be made that the floor covering has at least one further layer. Moreover, the floor covering can also comprise a plurality of base layers. The at least one further layer can comprise a film which is arranged on the base layer. In accordance with the invention, the base layer and/or the further layer can be designed as a decorative layer.

A particularly advantageous embodiment provides that decorative elements are embedded into the matrix. Preferably, the decorative elements are visible from a second side which is opposite the first side. The decorative elements can be, in particular, particles which have a different colour from the matrix.

In a particularly preferred manner, the floor covering is an elastomer floor covering or a TPE floor covering.

In an advantageous manner, the adhesive is softened by the supply of energy prior to application to the base layer.

It is also advantageous if the softened adhesive is applied to the base layer by means of a roller or a doctor blade. Application using a roller is particularly preferred.

Preferably, a removable cover is applied to the adhesive layer.

Particularly good adhesion properties are achieved if the first side of the base layer is ground prior to the application of the contact adhesive.

However, by reason of the good adhesion properties provision can also be made that the first side of the base layer is not ground prior to the application of the contact adhesive. As a result, production costs are lowered and the consumption of resources is reduced.

In accordance with the invention, it is particularly preferred if, prior to application, the adhesive is heated to a processing temperature between 160° C. and 200° C. Preferably, the adhesive is heated to a processing temperature between 170° C. and 190° C. This contributes to advantageous adhesion properties.

Further objectives, features, advantages and possible applications of the present invention will be apparent from the description hereinafter of embodiments and the drawing. All of the described and/or figuratively illustrated features form the subject matter of the invention in their own right or in any meaningful combination, even irrespective of the combination in individual claims or dependency references thereof.

Figure 1:
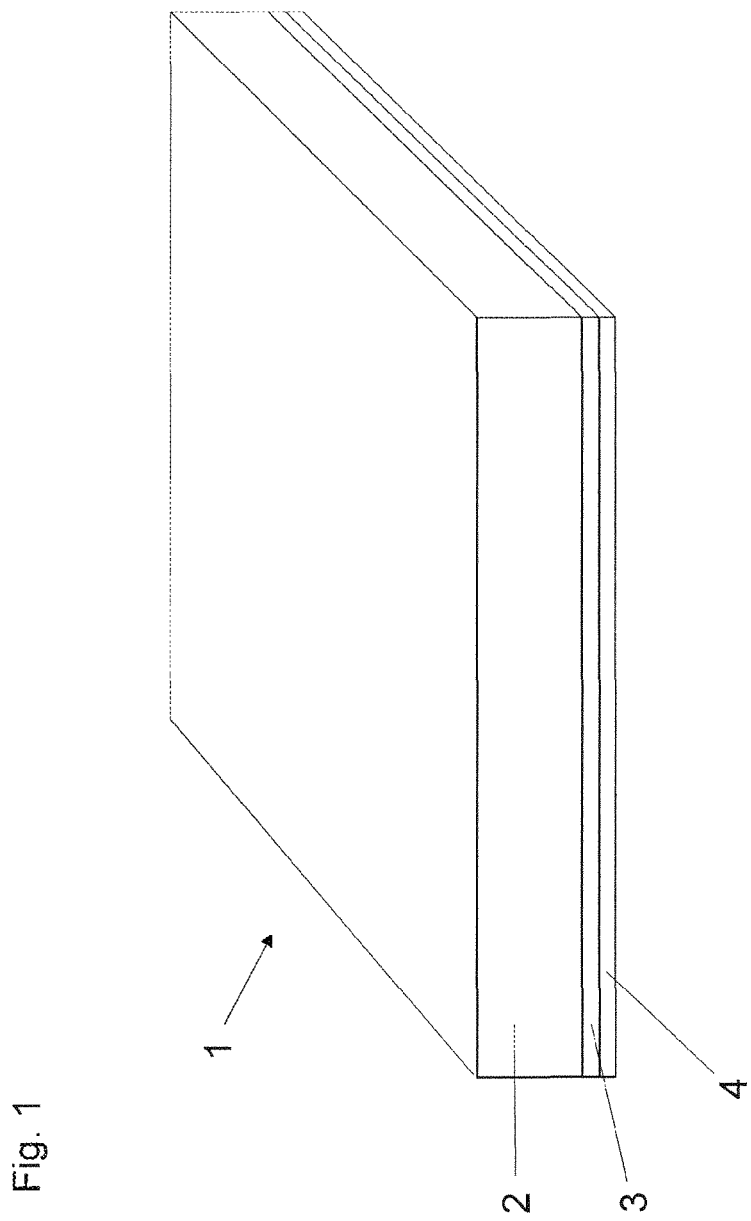
FIG. 1 shows a schematic view of a self-adhesive floor covering in accordance with the invention.

FIG. 1 schematically shows a floor covering 1 in accordance with the invention. The floor covering has a base layer 2. Arranged on a first side shown in FIG. 1 at the bottom is an adhesive layer 3 which has an adhesive for connecting the floor covering to a substrate. The adhesive layer 3 is provided with a cover 4. This protects the adhesive layer 3 until the point in time the laying procedure is to take place. Prior to the laying procedure, the cover 4 is peeled off so that the floor covering 1 comprising the adhesive layer 3 can be brought into contact with the substrate.

The base layer 2 has a matrix which contains a polymer composition. The polymer composition comprises an elastomer which is produced by cross-linking rubber. According to another embodiment, the base layer comprises a thermoplastic elastomer.

The adhesive layer 3 contains an adhesive which is a pressure-sensitive contact adhesive. Therefore, the floor covering 1 can be permanently adhered to a substrate, such as e.g. a screed, at typical room temperatures immediately after removal of the cover 4. It is sufficient to lay the floor covering 1 having the adhesive layer 3 onto the substrate and to press the floor covering 1 against the substrate in order to establish the adhesive connection. After applying the floor covering 1, there is no need to observe any waiting time.

The adhesive in the adhesive layer comprises a styrene-based thermoplastic elastomer. A corresponding adhesive is available under the designation Technomelt PS 8795-22 from the company Henkel AG & Co. KGaA.

The cover 4 is an HDPE film which is siliconized on one side.

The size ratios illustrated in FIG. 1 are not to scale. Typically, the thickness of the base layer 2 is between 1 mm and 10 mm. The thickness of the adhesive layer 3 is between 0.01 mm and 1 mm and preferably between 0.5 mm and 0.2 mm.

In order to verify the adhesion properties, the floor covering noraplan 913 signa from the company nora systems GmbH was used for the base layer. This is an elastomer floor covering of NR and SBR. The product was coated on one side with the adhesive Technomelt PS 8795-22 from the company Henkel AG & Co. KGaA. The adhesive was applied in a quantity of 130 g/m$^2$. The cover used was an HDPE film which is siliconized on one side.

After peeling off the cover 4, the floor covering 1 having the adhesive layer 3 was adhered onto an aluminium sheet. Then, the peel strength was determined in accordance with DIN 13 72:2015. This resulted in a peel strength of 0.7 N/mm. A good peel strength is achieved thereby.

Furthermore, a change in dimension was determined after the exposure to heat (50° C.). The change in dimension was only 0.17%. This low change in dimension after the exposure to heat proves the high quality of the adhesion of the floor covering 1 to the substrate.

Figure 2:
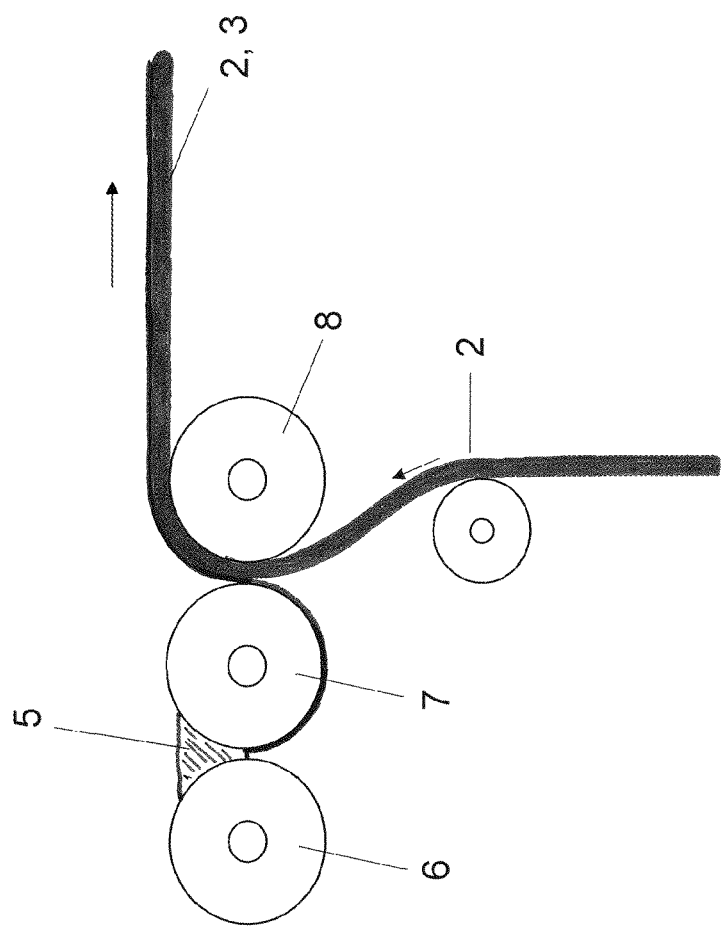
FIG. 2 shows a device for coating the floor covering with the adhesive layer.

FIG. 2 explains the method of producing the self-adhesive floor covering. It can be clearly seen that a sheet-like base layer 2 is provided. Furthermore, an adhesive 5 is provided which comprises a styrene-based thermoplastic elastomer. The adhesive 5 is heated to a processing temperature between 170° and 190°. The adhesive 5 is a hot-melt contact adhesive. The adhesive is introduced into the gap between an application roller 7 and a further roller 6. The application roller 7 is rotating and picks up on its surface a thin layer of the adhesive 5 and transfers it to the base layer 2. The base layer 2 is pressed with the counter-pressure roller 8 against the application roller 7. The base layer 2 which is provided with the adhesive layer 3 in this manner can be covered by a cover 4 in a manner not illustrated. Subsequently, the floor covering 1 is cut to the desired length and is sold as sheet-like floor covering or as floor covering tiles.

What is claimed is:

1. Self-adhesive floor covering comprising a base layer having a thickness between 1 mm to 10 mm, comprising a polymer composition, comprising an elastomer and/or a thermoplastic elastomer, wherein the base layer comprises a matrix comprising the polymer composition, wherein the matrix comprises a filler selected from the group consisting of a chalk, a silicic acid, a silica, an aluminum hydroxide, a kaolin, a sodium aluminum silicate, a glass powder, a wood flour, and combinations thereof, in a weight proportion of between 50 and 500 parts of the filler to 100 parts of the polymer composition in the matrix, wherein the floor covering has, on a first side of the base layer, an adhesive layer having a thickness between 0.01 mm and 1 mm, comprising an adhesive for connecting the floor covering to a substrate, characterised in that the adhesive comprises a styrene-based thermoplastic elastomer.

2. The self-adhesive floor covering according to claim 1, wherein the adhesive of the adhesive layer is a contact adhesive.

3. The self-adhesive floor covering according to claim 1, wherein the adhesive of the adhesive layer is a hot-melt adhesive.

4. The self-adhesive floor covering according to claim 1, wherein the styrene-based thermoplastic elastomer comprises a styrene block copolymer.

5. The self-adhesive floor covering according to claim 1, wherein the styrene-based thermoplastic elastomer comprises a triblock copolymer having the structure S-X-S, wherein S is a styrene block and X is a block having elastomeric properties at 20° C.

6. The self-adhesive floor covering according claim 1, wherein the styrene-based thermoplastic elastomer comprises a diblock copolymer.

7. The self-adhesive floor covering of claim 6, wherein the styrene-based thermoplastic elastomer further comprises a triblock copolymer.

8. The self-adhesive floor covering according to claim 1, wherein the styrene-based thermoplastic elastomer comprises at least one compound from the group consisting of styrene-butadiene-styrene block copolymer, styrene-isoprene-styrene block copolymer, styrene-ethylene-butylene-styrene block copolymer and styrene-ethylene-propylene-styrene block copolymer.

9. The self-adhesive floor covering according to claim 1, wherein the adhesive layer on the first side of the base layer is in a quantity of between 10 g/m$^2$ and 1000 g/m$^2$.

10. The self-adhesive floor covering according to claim 1, wherein the polymer composition comprises a polymer which comprises at least one monomer unit selected from the group consisting of styrene, butadiene and isoprene.

11. The self-adhesive floor covering according to claim 1, wherein the polymer composition comprises at least one substance selected from the group consisting of natural rubber, polybutadiene, styrene-butadiene rubber, acrylonitrile-butadiene rubber, styrene-butadiene-styrene block copolymer, and styrene-isoprene-styrene block copolymer and wherein the proportion of the at least one substance is greater than 20% by weight, based on a total quantity of polymers in the base layer.

12. The self-adhesive floor covering of claim 1, wherein a mass per area of the adhesive layer on the first side of the base layer is between 50 g/m$^2$ and 300 g/m$^2$.

13. The self-adhesive floor covering of claim 1, wherein a viscosity of an adhesive of the adhesive layer is between 10,000 mPas and 30,000 mPas at 180° C.

14. The self-adhesive floor covering of claim 1, wherein a styrene block of the styrene-based thermoplastic elastomer is a crystalline block at 20° C.

15. The self-adhesive floor covering of claim 1, wherein a mass per area of the adhesive layer on the first side of the base layer is between 125 g/m$^2$ to 1000 g/m$^2$.

16. The self-adhesive floor covering of claim 1, wherein the weight proportion is between 150 and 300 parts of the filler to 100 parts of the polymer composition in the matrix.

17. The self-adhesive floor covering of claim 1, wherein the weight proportion is between 150 and 500 parts of the filler to 100 parts of the polymer composition in the matrix.

18. A method for producing a self-adhesive floor covering, comprising the steps of:
providing a base layer having a thickness between 1 mm to 10 mm, comprising a polymer composition, which comprises an elastomer and/or a thermoplastic elastomer, wherein the base layer comprises a matrix comprising the polymer composition, wherein the matrix comprises a filler selected from the group consisting of a chalk, a silicic acid, a silica, an aluminum hydroxide, a kaolin, a sodium aluminum silicate, a glass powder, a wood flour, and combinations thereof, in a weight proportion of between 50 and 500 parts of the filler to 100 parts of the polymer composition in the matrix;
providing an adhesive layer having a thickness between 0.01 mm and 1 mm, which comprises a styrene-based thermoplastic elastomer; and
applying the adhesive layer to a first side of the base layer for producing a floor covering with an adhesive layer for connecting to a substrate.

19. A self-adhesive floor covering, comprising:
a base layer having a thickness between 1 mm to 10 mm, wherein the base layer comprises an elastomer, wherein the base layer comprises a matrix comprising the elastomer, wherein the matrix comprises a filler selected from the group consisting of a chalk, a silicic acid, a silica, an aluminum hydroxide, a kaolin, a sodium aluminum silicate, a glass powder, a wood flour, and combinations thereof, in a weight proportion of between 50 and 500 parts of the filler to 100 parts of the elastomer in the matrix; and
an adhesive layer having a thickness between 0.01 mm and 1 mm, comprising a styrene-based thermoplastic elastomer on a first side of the base layer, wherein the styrene based thermoplastic elastomer comprises more than 5% and less than 75% of a diblock copolymer based on a total weight quantity of the styrene based thermoplastic elastomer, and a monomer.

20. The floor covering of claim 19, wherein the monomer is at least one of an isoprene monomer, a butadiene monomer, or combinations thereof.

21. The floor covering of claim 20, wherein the styrene-based thermoplastic elastomer further comprises a triblock copolymer.

22. The floor covering of claim 19, wherein a mass per area of the adhesive layer on the first side of the base layer is between 10 g/m$^2$ and 1000 g/m$^2$.

* * * * *